United States Patent
Sjouwerman et al.

(10) Patent No.: US 11,902,324 B2
(45) Date of Patent: *Feb. 13, 2024

(54) SYSTEM AND METHODS FOR SPOOFED DOMAIN IDENTIFICATION AND USER TRAINING

(71) Applicant: KnowBe4, Inc., Clearwater, FL (US)

(72) Inventors: Stu Sjouwerman, Belleair, FL (US); Alin Irimie, Clearwater, FL (US); Greg Kras, Dunedin, FL (US)

(73) Assignee: KnowBe4, Inc.

( * ) Notice: Subject to any disclaimer, the term of this patent is extended or adjusted under 35 U.S.C. 154(b) by 133 days.

This patent is subject to a terminal disclaimer.

(21) Appl. No.: 17/711,472

(22) Filed: Apr. 1, 2022

(65) Prior Publication Data

US 2022/0224719 A1 Jul. 14, 2022

Related U.S. Application Data

(63) Continuation of application No. 16/865,952, filed on May 4, 2020, now Pat. No. 11,316,892, which is a continuation of application No. 16/143,132, filed on Sep. 26, 2018, now Pat. No. 10,673,894.

(51) Int. Cl.
*H04L 9/30* (2006.01)
*H04L 29/06* (2006.01)
*H04L 9/40* (2022.01)
*G06N 20/00* (2019.01)

(52) U.S. Cl.
CPC ......... *H04L 63/1466* (2013.01); *G06N 20/00* (2019.01); *H04L 63/1416* (2013.01)

(58) Field of Classification Search
CPC .. H04L 63/1466; H04L 63/1416; G06N 20/00
See application file for complete search history.

(56) References Cited

U.S. PATENT DOCUMENTS

| 7,475,425 | B2 | 1/2009 | Bantz et al. |
| 7,599,992 | B2 | 10/2009 | Nakajima |
| 8,041,769 | B2 | 10/2011 | Shraim et al. |
| 8,464,346 | B2 | 6/2013 | Barai et al. |
| 8,484,741 | B1 | 7/2013 | Chapman |

(Continued)

FOREIGN PATENT DOCUMENTS

| EP | 3 582 468 A1 | 12/2019 |
| WO | WO-2016/164844 A1 | 10/2016 |

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.

(Continued)

*Primary Examiner* — Wasika Nipa
(74) *Attorney, Agent, or Firm* — Foley & Lardner LLP

(57) ABSTRACT

Systems and methods are disclosed that minimize ongoing risk to an organization from user behaviors which magnify the severity of a spoofed domain. Systems and method are provided which enable an entity and users of an entity to identify potential harmful domains, combining search, discovery, reporting, the generation of risk indicators, end-user risk assessments, and training into a security awareness system.

16 Claims, 8 Drawing Sheets

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,869,269 B1 | 10/2014 | Ramzan et al. |
| 8,910,287 B1 | 12/2014 | Belani et al. |
| 8,966,637 B2 | 2/2015 | Belani et al. |
| 8,990,933 B1 | 3/2015 | Magdalin |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,838,407 B1 | 12/2017 | Oprea et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 10,862,907 B1 | 12/2020 | Pon et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2006/0069697 A1 | 3/2006 | Shraim et al. |
| 2006/0069967 A1 | 3/2006 | Almy et al. |
| 2007/0039038 A1 | 2/2007 | Goodman et al. |
| 2007/0142030 A1 | 6/2007 | Sinha et al. |
| 2007/0192855 A1 | 8/2007 | Hulten et al. |
| 2007/0299777 A1 | 12/2007 | Shraim et al. |
| 2008/0270203 A1 | 10/2008 | Holmes et al. |
| 2009/0144308 A1 | 6/2009 | Huie et al. |
| 2010/0211641 A1 | 8/2010 | Yih et al. |
| 2010/0269175 A1 | 10/2010 | Stolfo et al. |
| 2011/0314542 A1 | 12/2011 | Viswanathan et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0156210 A1* | 6/2015 | Hunt ............... H04L 63/1466 726/23 |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2015/0326606 A1 | 11/2015 | Chen |
| 2016/0036829 A1 | 2/2016 | Sadeh-Koniecpol et al. |
| 2016/0055490 A1 | 2/2016 | Keren et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0126729 A1* | 5/2017 | Oberheide ......... H04L 63/1483 |
| 2017/0140663 A1 | 5/2017 | Sadeh-Koniecpol et al. |
| 2017/0195310 A1 | 7/2017 | Tyler et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2017/0331849 A1 | 11/2017 | Yu et al. |
| 2018/0011573 A1 | 1/2018 | Yu et al. |
| 2018/0020092 A1 | 1/2018 | Bender et al. |
| 2018/0041537 A1 | 2/2018 | Bloxham et al. |
| 2018/0103052 A1 | 4/2018 | Choudhury et al. |
| 2018/0337947 A1 | 11/2018 | Schiffman |
| 2019/0141077 A1 | 5/2019 | Tyler et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Final Office Action on U.S. Appl. No. 16/143,132 dated Apr. 19, 2019.

Non-Final Office Action on U.S. Appl. No. 16/143,132 dated Jan. 4, 2019.

Notice of Allowance on U.S. Appl. No. 16/143,132 dated Feb. 12, 2020.

Notice of Allowance on U.S. Appl. No. 16/143,132 dated Sep. 24, 2019.

Notice of Allowance on U.S. Appl. No. 16/865,952 dated Mar. 7, 2022.

Notice of Allowance on U.S. Appl. No. 16/865,952 dated Mar. 23, 2022.

Palka et al., "Dynamic phishing content using generative grammars," Software Testing, Verification and Validation Workshops (ICSTW), 2015 IEEE Eighth International Conference, Date of Conference: Apr. 13-17, 2015, IEEE Xplore, pp. 1-8.

U.S. Office Action on U.S. Appl. No. 16/865,952 dated Feb. 19, 2021.

U.S. Advisory Action on U.S. Appl. No. 16/865,952 dated Oct. 22, 2021 (5 Pages).

* cited by examiner

SYSTEM AND METHODS FOR SPOOFED DOMAIN IDENTIFICATION AND USER TRAINING

CROSS-REFERENCE TO RELATED PATENT APPLICATIONS

This patent application is a continuation of, and claims priority to and the benefit of U.S. patent application Ser. No. 16/865,952, titled, "SYSTEMS AND METHODS FOR SPOOFED DOMAIN IDENTIFICATION AND USER TRAINING" filed on May 4, 2020, which is a continuation of, and claims priority and the benefit of U.S. patent application Ser. No. 16/143,132, titled "SYSTEMS AND METHODS FOR SPOOFED DOMAIN IDENTIFICATION AND USER TRAINING," and filed Sep. 26, 2018, the contents of all of which are hereby incorporated herein by reference in its entirety for all purposes.

This disclosure generally relates to security awareness systems and methods useful for minimizing ongoing organization risk that is present from spoofed domains.

BACKGROUND

Domain spoofing, also called URL hijacking, typo squatting, sting site, or fake URLs, is a form of cybersquatting and possibly brandjacking which relies on mistakes such as typos made by Internet users when inputting a website address into a web browser. Should a user accidentally enter an incorrect website address that looks similar to the website address they intended to visit, they may be led to an alternative website owned by a typo squatter. The typo squatter's URL will typically contain a common misspelling or foreign language spelling of the intended site, or a misspelling based on typos, or a differently phrased domain name or a different top-level domain. Occasionally typo squatters will use an abuse of the top-level domain by leaving out a letter, e.g. .cm instead of .com. Spoofed domains can be used to collect information from unsuspecting users, to inject malware into computer systems, and to do damage to a company's brand and reputation.

SUMMARY OF THE INVENTION

Systems and methods are disclosed that minimize ongoing risk to an organization from user behaviors which magnify the severity of a spoofed domain. Systems and method are provided which enable an entity and users of an entity to identify potential harmful domains, combining search, discovery, reporting, the generation of risk indicators, end-user risk assessments, and training into a security awareness system.

In some examples, a server identifies a plurality of URLs that are similar to domains of an entity. These domains may be called, for example, "associated domains", "spoofed domains", or "look-alike domains" and they are similar to, or look like, actual domains of the entity. The server identifies whether they are registered to a third party or unregistered or registered privately, for example by checking the mail exchange records. Where a spoofed domain is registered to a third party, in some examples the server does not record or track the third party that the spoofed domain is registered to. In some examples, the server does record or track the third party that the spoofed domain is registered to. A domain that is registered to a third party may be privately registered, i.e., privately registered spoofed domains are a subset of third party spoofed domains. Where the associated domains are not registered to the entity, the server determines a "level of spoof risk". In some examples, the level of spoof risk may be a measure of how difficult it is for a user to detect an associated domain. In some examples, the level of spoof risk of the entity domain impacts how vulnerable the entity users are and may impact one or more risk indicators of users and/or the entity. The level of spoof risk may be determined through a comparison of a number of available spoofed domains of the domain name of an entity and instances in which the available spoofed domains have been registered to third parties. In some examples, the level of spoof risk may incorporate whether the available spoofed domain has a private registration, an active web server and/or an active mail server. In examples, the level of spoof risk may incorporate how closely the content at the registered spoofed domain is designed to resembled content at the entity's valid domain(s).

In some examples, the server generates an electronic training campaign configured to train one or more users to differentiate between domain names of the entity and spoofed domain names. The server then communicates the training campaign to one or more devices of the users.

The server may identify URLs that are either directed or redirected to the domain name of the entity and may identify URLs that are spoofed by typo squatting, URL hijacked, or that are a sting site, a phishing URL, or a fake URL. In some examples, the server identifies one or more URLs that are permutations of the URL of the domain of the entity in Punycode. In embodiments, the server identifies which domains (of the domains that are not registered to the entity) have active web servers or mail servers associated with them. In examples, the server determines whether there are private registrations of the spoofed domains. In embodiments, the identification of private registrations, active web servers and active mail servers with spoofed domains may impact one or more risk indicators of users and/or the entity.

Electronic training generated by the server may be based on data driven risk assessments, including user risk indicators, previous training by users, the level of spoof risk of the spoofed domain(s) to entity domain associated with that user, a user's role in the organization, a user's profile, and a user's past training and cyber history with respect to typo squatting and spoofed domains.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for creating and executing specific security awareness training campaigns by a security awareness system, wherein the training campaigns utilize identified spoofed domain information.

A. Computing and Network Environment

Figure 1A:
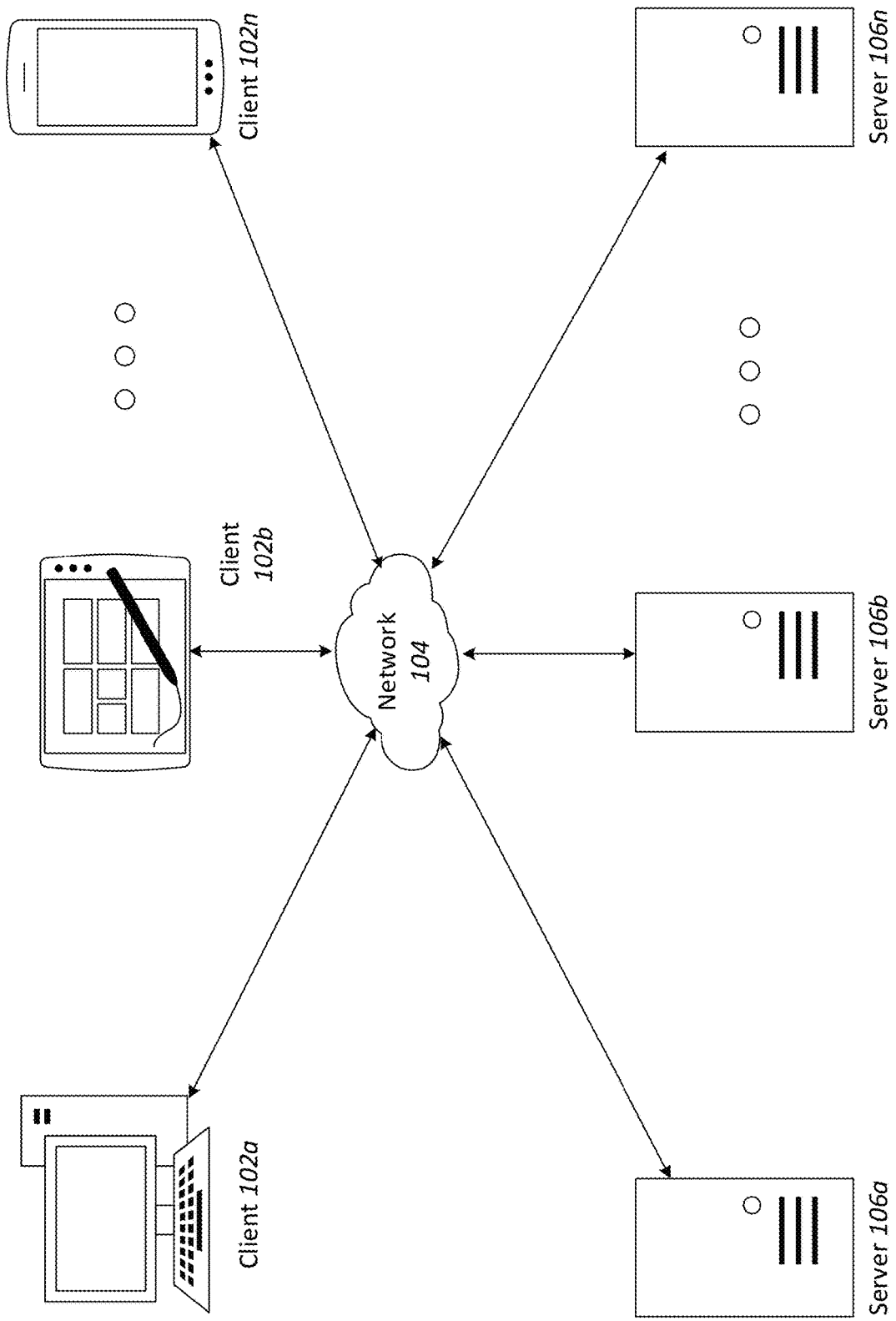
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
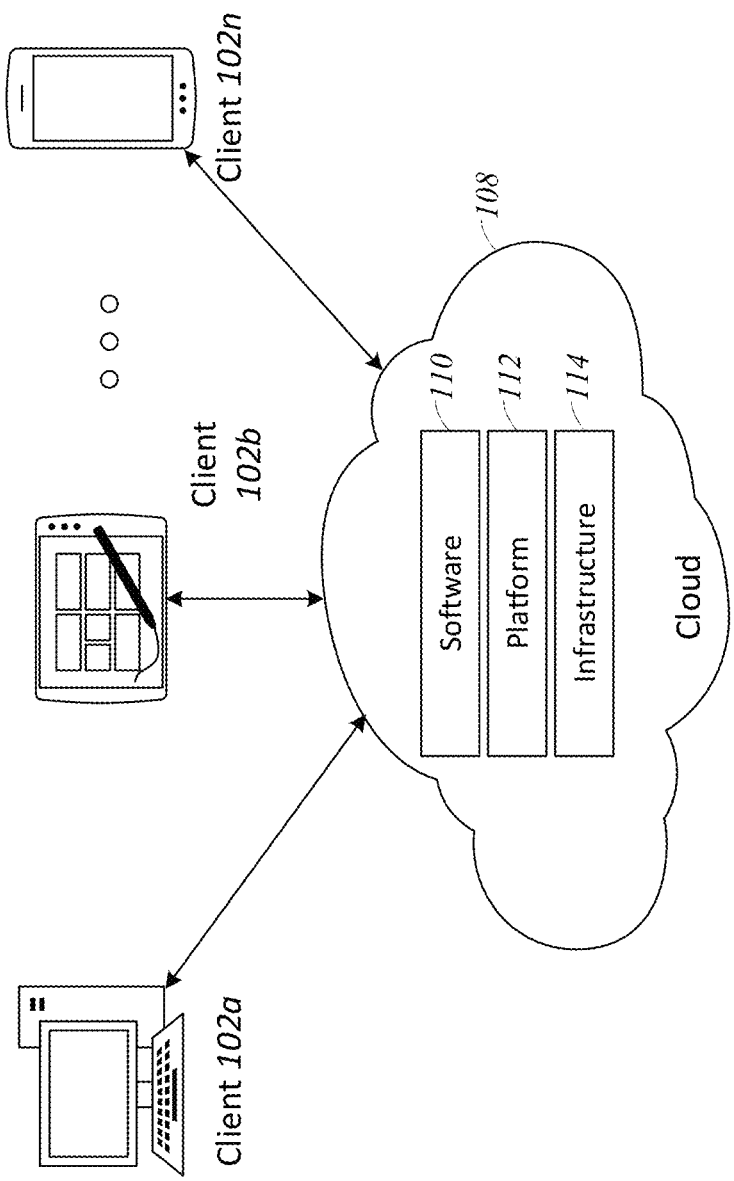
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
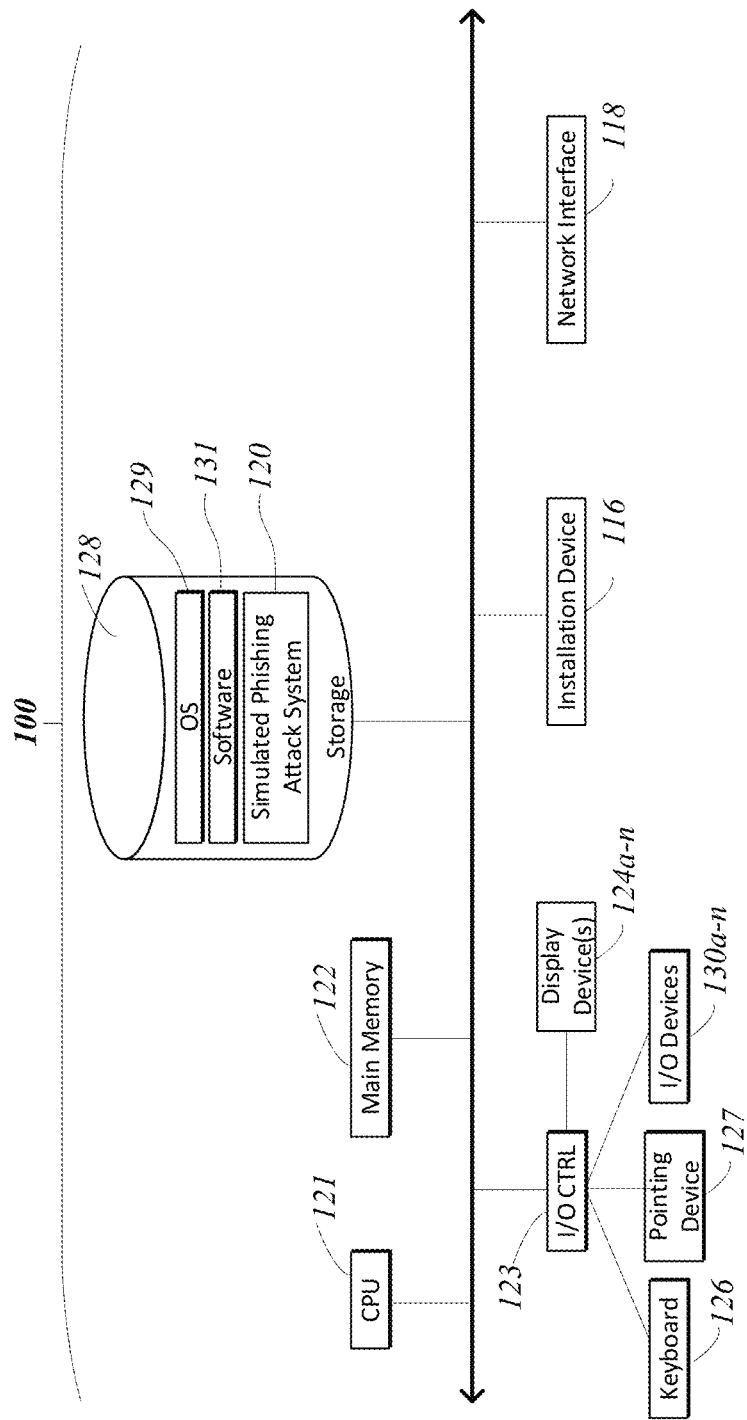
FIGS. 1C and 1D are block diagrams depicting embodiments of computing devices useful in connection with the methods and systems described herein.
Figure 1D:
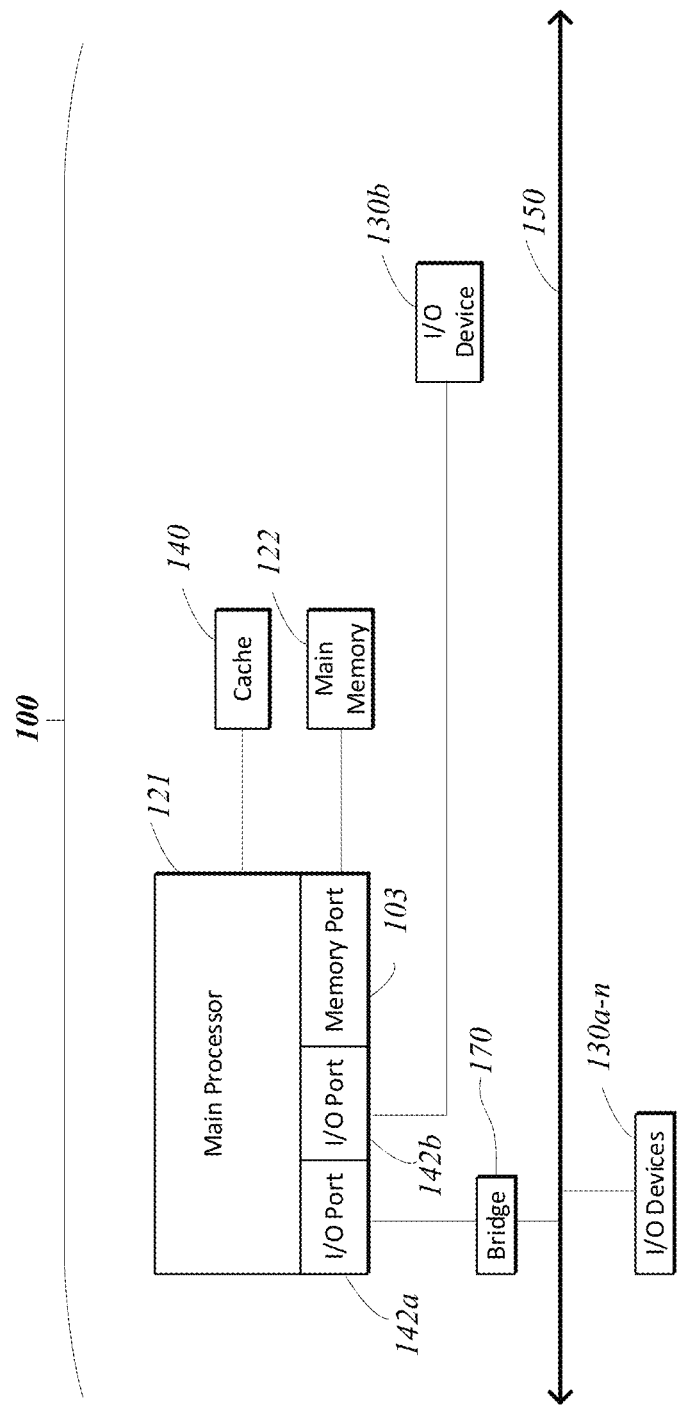

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Security Awareness Training Systems and Methods

The following describes systems and methods of creating, controlling and executing security awareness training campaigns that utilized spoofed domain information to minimize ongoing risk to an organization from users who may have difficulty identifying look-alike domains.

A system can be configured to send simulated phishing emails, text messages, phone calls (e.g. via VoIP), video and Internet based communications, all which may be referred to as "electronic training" or simply "training". The system may vary the quantity, frequency, type, sophistication, content, timing, and combination of training. A set of training emails, text messages, phone calls, video and/or Internet based communications ("electronic training content") sent to one or more users may be referred to as a training campaign. In some implementations, some or all of the electronic training content in a training campaign may be used to inform a user or group of users about risks and/or best practices for a particular subject. In some examples, all of the electronic training content in a training campaign relates to one particular subject. In embodiments, all of the electronic training content in a training campaign relates to more than one subject in a group of subjects with a common theme. In some implementations, traditional training content, such as posters, handouts, flyers, group seminars, and the like, may be provided in addition or as a complement to electronic training content.

A training campaign may be intended to lure the user to perform an action that is considered a risk to an IT system, in order to create a teachable moment where the user can be shown how their action can compromise the system. In some implementations, electronic training content can be configured to look like genuine messages from internal IT systems, external platforms, or other trusted senders in an attempt to lure the user to interact with it. In some implementations, electronic training content of a training campaign may be intended to lure the user to provide personal information such as user names, passwords, identification numbers, account numbers, or to change their password. The desired user response is referred to as the 'action', or the 'requested action', or the 'desired action'. If the user performs the action, then the system can respond with training, which may be called "remedial training".

In some implementations, the system may adaptively learn the best method (e.g., set of steps) and/or the best combination of electronic content to get the user to perform the action, such as providing personal information or engaging with a website. The learning process implemented by the system can be trained by observing the behavior of other users in the same company or in the same industry, by observing the behavior of all other users of the system, or by observing the behavior of a subset of other users in the system based on one or more attributes of the subset of other users meeting one or more selected criteria.

The system can record when and how the action was performed and can produce reports about the actions that users perform in response to electronic training. In particular, if the action is for the user to engage with a website at a spoofed domain, the system can record the domain name that the user was spoofed by and determine what kind of additional training to provide to that user, or for example, users of the same entity, or users with similar roles, or any other groups of users as may be appropriate. Where the electronic training content was sent to multiple users, in some examples the system can track whether more than one user engaged with a website at a spoofed domain.

In some implementations, the system may provide training on why a user should not have performed an action at the time that the user performs the action. In some implementations, the system may add users that performed actions to specific user groups that are scheduled to receive general or targeted remedial training at some time in the future. In some implementations, the system may assign a user attribute to a user that performed an action, and user attributes may be used to create query-based groups for future training campaigns. In embodiments, the user may be prevented from using their IT systems in a normal operational mode until the user completes remedial training.

A security awareness system may keep logs from previous training campaigns, including all actions performed on a user and all user actions performed, which may in some examples be used to inform future campaigns. A security awareness system may further use information from event logs, for example Windows event logs, as well as learning management system (LMS) analysis, which may inform the security awareness system what training a user has had, where the user performed well and where the user struggled with the training that the user completed, and what the user should know. A security awareness system may use information from company profiling activities, for example email exposure check results, applications used, software as a service (SaaS) services used, etc. A security awareness system may use information from industry profiles corresponding to an industry that a user's company is associated with.

In some embodiments, a security awareness system is capable of performing risk analysis of users, groups of users, or a company. For example, a security awareness system may be able to perform a risk profile of a user with respect to accessing spoofed domains. In some embodiments, a security awareness system can track events in a company and/or for a user in a company to identify one or more risk points, for example, in some embodiments, a system can track information that a given user is exposed to, in order to identify a risk point. For example, company employees that regularly deal with wire transfers may be likely to be at a higher risk for wire transfer fraud, and people that are exposed to sensitive information may be at a higher risk for leaking intellectual property.

In some embodiments, a security awareness system training campaign duration is limited to a fixed period of time, for example a fixed number of days. In some embodiments, a security awareness training campaign will terminate once a certain percentage of users fail the campaign, for example in a fixed period of time. In some embodiments, a security awareness training campaign stops when a certain percentage of users demonstrate compliance with one or more IT policies or procedures.

Figure 2A:
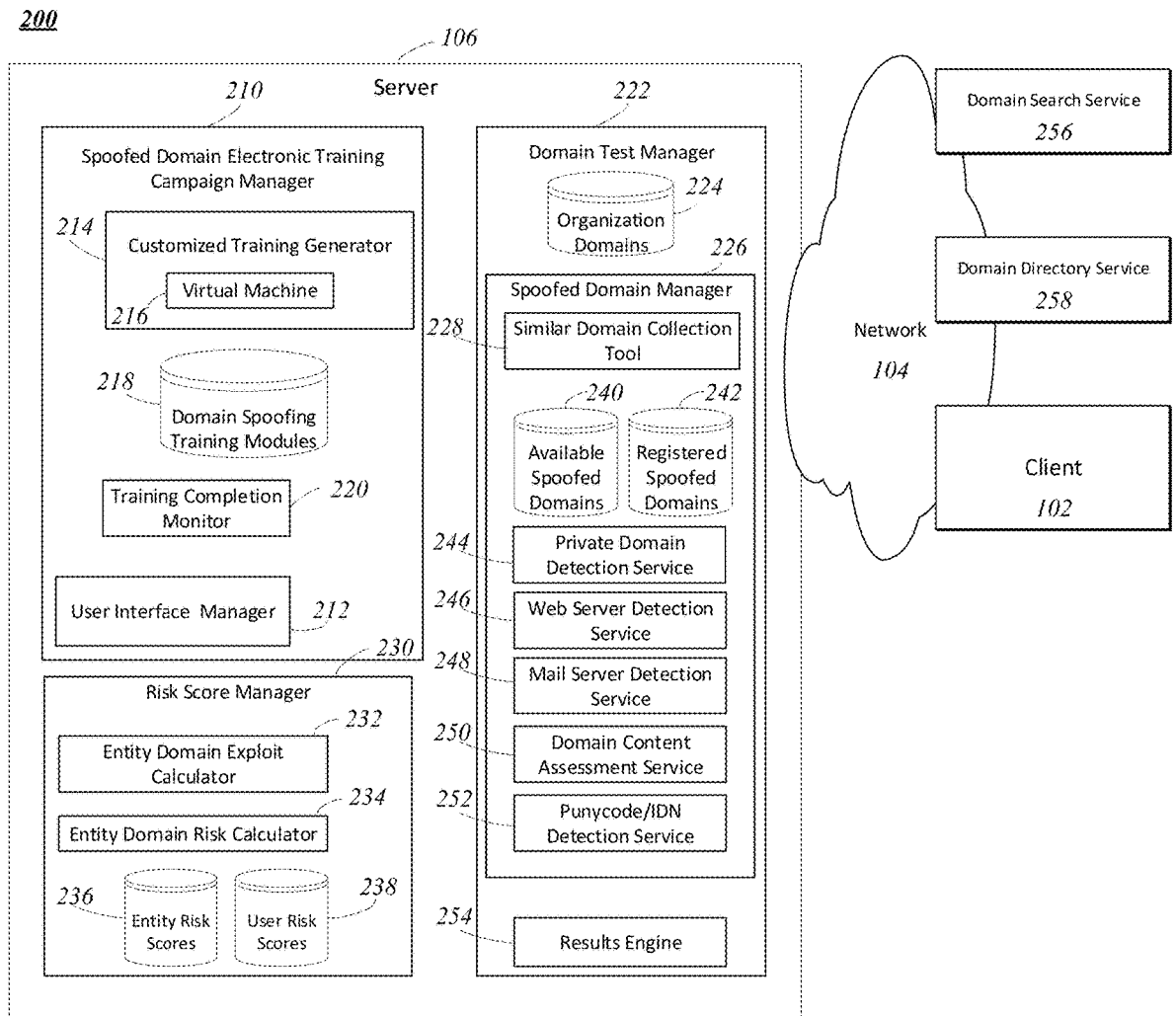
FIG. 2A depicts an implementation of some of the server architecture of an implementation of a system capable of identifying spoofed domains and training users, according to some embodiments.

Referring to FIG. 2A in a general overview, FIG. 2A depicts some of the server architecture of an implementation of a system 200 capable of creating, controlling and executing electronic campaigns, searching and testing domains, and creating, controlling and utilizing risk scores with based on domain spoof risk and user behavior. In some implementations, system 200 includes server 106 and client 102 and network 104 allowing communication between these system components. Server 106 may include spoofed domain electronic training campaign manager 210, domain test manager 222, and risk score manager 230. Spoofed domain electronic training campaign manager 210 may include user interface manager 212, and customized training generator 214, which may include virtual machine 216. In some implementations, system 200 may include training completion monitor 220, and storage for domain spoofing training modules 218. Domain test manager 222 may spoofed domain manager 226, results engine 254, and storage for organization domains 224. Spoofed domain manager 226 may include similar domain collection tool 228, private domain detection service 244, web server detection service 246, mail server detection service 248, domain content assessment service 250, and punycode/IDN detection service 252. Spoofed domain manager 226 may include available spoofed domains storage 240 and registered spoofed domains storage 242.

In some implementations, system 200 includes risk score manager 230, which may include entity domain exploit calculator 232, entity domain risk calculator 234, as well as entity risk scores storage 236 and/or user risk scores storage 238. System 200 may include one or more external domain search services 256 and domain directory services 258, with which server 106 and client 102 can communicate with over network 104.

Referring again to FIG. 2A in more detail, spoofed domain electronic training campaign manager 210 generally manages the process of curating, sending, and analyzing one or more training campaigns to train users about spoofed or look alike domains. Spoofed domain electronic training campaign manager 210 may communicate with domain test manager 222, for example to identify similar domains to the entity domains which may be used when creating domain spoofing training modules or in generating customized training. In examples, spoofed domain electronic training campaign manager 210 may communicate with domain search service 256, domain directory service 258, and/or client 102 via network 104.

In examples, spoofed domain electronic training campaign manager 210 includes customized training generator 214, which may be implemented as or contain virtual machine 216. In examples, customized training generator 214 is operable to integrate information from one or more of domain test manager 222, domain search service 256, domain directory service 258, client 102, and risk score manager 230, to generate training campaigns related to spoofed domains. In some examples, customized training generator 214 may generated training campaigns that are specific to a single user. In examples, customized training manager generates training campaigns that are applicable to multiple users, groups of users, or users associated with an entity. Spoofed domain electronic training campaign manager 210 may include user interface manager 212. In some examples, responsive to a user input, spoofed domain electronic training campaign manager 210 generates a training campaign, including one or more domain spoofing training modules from domain spoofing training modules storage 218, responsive to one or more inputs from risk score manager 230, domain test manager 222, and/or client 102. For example, spoofed domain electronic training campaign manager 210 may generate a training campaign for a user responsive to a change in a user risk score from risk score manager 230. In examples, spoofed domain electronic training campaign manager 210 may generate a training campaign for users associated with an entity responsive to a change in an entity risk score from risk score manager 230. In examples, spoofed domain electronic training campaign manager 210 may generate a training campaign for users and/or for an entity responsive to a new spoofed domain appearing in available spoofed domains storage 240 and/or registered spoofed domains storage 242. In some examples, spoofed domain electronic training campaign manager 210 may generate a training campaign for users and/or for an entity responsive to results from a query to domain search service 256 and/or domain directory service 258. In some examples, spoofed domain electronic training campaign manager 210 may generate a training campaign for users and/or for an entity responsive to a change in organization domains stored in organization domains storage 224.

Spoofed domain electronic training campaign manager 210 may manage various aspects of an electronic training campaign. For example, spoofed domain electronic training campaign manager 210 may process input from server 106 and/or may provide access as needed to various applications, modules, and other software components of server 106 to other various applications, modules, and other software components of server 106. Spoofed domain electronic training campaign manager 210 may monitor and control timing of various aspects of a training campaign, may process requests for access to training campaign results, and/or may perform other tasks related to the management of a spoofed domain training campaign.

In some embodiments, spoofed domain electronic training campaign manager 210 may be integrated with or coupled to memory 122. In some embodiments, memory 122 may include any type and form of storage, such as a database or file system. Memory 122 may store data such as parameters and scripts corresponding to the choices made by server 106 through spoofed domain electronic training campaign manager 210, e.g. as described above for a particular spoofed domain training campaign.

In an implementation, spoofed domain electronic training campaign manager 210 includes customized training generator 214. Customized training generator 214 may be integrated with or coupled to memory 122, so as to provide customized training generator 214 access to parameters associated with messaging choices made for a particular training campaign by e.g. the server 106. Customized training generator 214 may be integrated with or coupled to memory or a memory store or otherwise a storage, such as a database, containing domain spoofing training modules 218. Customized training generator 214 may be an application, service, daemon, routine, or other executable logic for generating training. In some embodiments, customized training generator 214 can be configured to generate messages having the ability to traverse users who interact with the messages to a specific landing page to provide further training.

In an implementation, spoofed domain electronic training campaign manager 210 may be e.g., another name for a system administrator, such as a security manager, a third-party security consultant, a risk assessor, or any other party that uses spoofed domain electronic training campaign manager 210 installed on a server. Server 106 may wish to direct a spoofed domain training test by interacting with spoofed domain electronic training campaign manager 210 installed on server 106. Spoofed domain electronic training campaign manager 210 may be, for example, a desktop computer, a laptop computer, a mobile device, or any other suitable computing device. Spoofed domain electronic training campaign manager 210 may be e.g., an application on a device that allows a user of the device to interact with server 106 for e.g. purposes of creating, configuring, tailoring and/or executing a spoofed domain training test and/or viewing and/or processing and/or analyzing the results of a spoofed domain training test.

In an implementation, spoofed domain electronic training campaign manager 210, when executed, causes a graphical user interface to be displayed. In other embodiments, spoofed domain electronic training campaign manager 210 allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, California), Microsoft Internet Explorer (Microsoft, Redmond, Washington), or Mozilla Firefox (Mozilla Foundation of Mountain View, California), or may be an application installed on a user device capable of opening a network connection to spoofed domain electronic training campaign manager 210 or may be any other type of interface.

In an implementation, spoofed domain electronic training campaign manager 210 and/or server 106 may make choices concerning how spoofed domain training is to be carried out. For example, a graphical user interface run by spoofed domain electronic training campaign manager 210 may be displayed to server 106. An administrator, via server 106, may input parameters for the training that affect how it will be carried out. For example, via server 106 an administrator may make choices as to which users to include as potential recipients of the training, the method of determining which users are to be selected as potential recipients of the training, the timing of various aspects of the training, whether to use a domain spoofing training module that includes one or a plurality of actual spoofed domains, how responses from targeted users should be uniquely identified, and other choices. These choices may be made by selecting options displayed on a graphical user interface from dropdown menus, being presented with choices through a training wizard, or in any other appropriate manner.

In an implementation, spoofed domain electronic training campaign manager 210 may allow server 106, such as via application programming interfaces (APIs), to access and/or change settings of an account maintained with any party involved with the training, such as, for example, a third party security service provider, or may allow server 106 to access and/or change settings of an account maintained with a third party security service provider such as one that e.g. manages an exploit server, view bills and/or make payments to a third party security service provider, to perform these functions with other third parties involved in the training, or provide any other functions that would be appropriate for facilitating communications between server 106 and any other parties involved in the training.

Server 106 may include risk score manager 230. Risk score manager 230 may process input from server 106 and/or may provide access as needed to various applications, modules, and other software components of server 106 to other various applications, modules, and other software components of server 106. Risk score manager 230 may monitor and control inputs and various other system aspects which would lead to the adjustment of user or entity risk scores, for example in response to updated domain information in organization domains storage 224, available spoofed domains storage 240, registered spoofed domains storage 242, or responsive to inputs from private domain detection service 244, web server detection service 246, mail server detection service 248, domain content assessment service 250, punycode/IDN detection service 252, results engine 254, and/or training completion monitor 220. Risk score manager 230 may update user risk scores in user risk scores storage 238, and/or entity risk scores in entity risk scores storage 236, in response to completion of one or more training modules and/or training campaigns and may process requests for access to risk scores and/or may perform other tasks related to the management of risk scores for users and/or entities. In some embodiments, risk score manager 230 may be integrated with or coupled to memory 122. In some embodiments, the memory may include any type and form of storage, such as a database or file system. Memory 122 may store data such as parameters and scripts corresponding to the choices made by server 106 through risk score manager 230, e.g. as described above for a particular training campaign. Spoofed domain electronic training campaign manager 210, domain test manager 222, and risk score manager 230 may be an application, service, daemon, routine, or other executable logic.

User risk scores 236 and/or entity risk scores 238 may include reference identifiers and/or time stamps, which enable risk score manager 230 to track risk scores over time. The reference identifier for a user and/or entity may be integrated with or coupled to memory or a memory store or otherwise a storage, such as a database, containing reference identifiers. The reference identifier may be an application, service, daemon, routine, or other executable logic for recognizing reference identifiers and associating reference identifiers with a particular user or entity. When the system provides training to a user, the training may include the user's reference identifier in the metadata of the training, which may be used by system 200 to track the details and timing of the delivery and completion of training provided to the user. In some examples, domain test manager 222 and/or spoofed domain electronic training campaign manager 210 may use a reference identifier to make inquiries, respond to inquiries, and generate reports for a user, or group of users. Spoofed domain electronic training campaign manager 210 may alert domain test manager 222 when a user, or a group of users, has failed spoofed domain security awareness training. In some embodiments, the reference identifier may be used in alerts and notifications to identify a particular user.

A risk score is a representation of a user's or group of users' vulnerability to a malicious attack. In some examples, risk score manager 230 calculates one or more risk scores based on information, for example training history, phishing history, responses to simulated phishing tests, demographic information, information about the organization, registered spoofed domains, and available spoofed domains. In some embodiments, a risk score framework is created, which outlines the data that is considered in creating the risk score and the method of calculating the risk score. In some examples, input from domain test manager 222 with respect to the extent of which one or more of an entity's domains are susceptible to spoofing, and/or the extent to which one or more of an entity's domains have been spoofed, in integrated into the determination of the risk score. In examples, aggregate information about one or more users who share the same organization may be used to determine entity risk scores.

In embodiments, user training records are integrated from training completion monitor 220 as a source of information used in the creation of user risk scores 238 and/or entity risk scores 236. For example, the training that the user has completed, the time spent engaged in training activities, the duration of the training modules that the user has completed, and other details related to training or learning about domain spoofing is incorporated by risk score manager 230 in risk user risk scores 238 and entity risk scores 236.

Server 106 may include domain test manager 222. Domain test manager 222 may process input from server 106 and/or may provide access as needed to various applications, modules, and other software components of server 106 to other various applications, modules, and other software components of server 106. Domain test manager 222 may monitor similar domain collection tool 228, which may make queries to domain search service 256 and/or domain directory service 258 via network 104. Domain test manager 222 may monitor when a user successfully completes spoofed domain electronic training. In some embodiments, domain test manager 222 may be integrated with or coupled to memory 122. In some embodiments, memory 122 may include any type and form of storage, such as a database or file system. Memory 122 may store data such as parameters and scripts corresponding to the choices made by a server 106 through domain test manager 222, e.g. as described above in response to a change in any genuine or spoofed domains and/or in response to spoofed domain training.

Domain test manager 222 may include organization domain storage 224. In some examples, organization domain storage 224 includes all domains that are owned by and/or registered to the entity or company. In some embodiments, organization domain storage 224 includes information identifying the main domain for an organization and one or more other domains registered to an organization, including regional domains, that are directed to the main domain. In some examples, organization domain storage 224 includes a history of when domains are added to or removed from organization domain storage 224. Domains stored in organization domain storage 224 may be structured in one or more records, wherein each record corresponds to a given domain and each record comprises all of the domains that are redirected to the given domain. In some examples, domains in organization domain storage 224 may be stored in records where each record consists of more than one field, for example the records may concatenate one or more of top-level domains (TLD) with sub domains. Domains stored in organization domain storage 224 may be stored in plain text or may be encrypted or hashed.

Domain test manager 222 may include available spoofed domains storage 240. Domain test manager 222 may interact with domain search service 256 and/or domain directory service 258 using similar domain collection tool 228 through network 104. In some examples, domain test manager 222 may access domain search service 256 and/or domain directory service 258 through an API, in some examples using one or more search terms. In examples, domain test manager 222 may use one or more tools to create permutations of one or more organization domains to use as search terms. For example, similar domain collection tool 228 may use the tool "dns-twist" located at www.github.com (GitHub, San Francisco, CA) which takes one or more organization domain names as a seed and generates a list of potential spoofed domains and then checks if they are registered, tests the mail server from the MX record and determines if the site is live. In examples, similar domain collection tool 228 will search similar domains with A, AAAA, NS, and MX DNS records. In examples, domain searches may additionally calculate or return a ranking of spoof risk based on how similar the spoofed domain is to the organization domain, such information may be used as inputs to entity domain exploit calculator 232 and/or entity domain risk calculator 234 and/or entity risk scores storage 236. In some embodiments, domain test manager 222 may store searched for spoofed domains that are not registered in available spoofed domains storage 240 and may store searched for spoofed domains that are registered in registered spoofed storage 242. In some embodiments, domain test manager 222 may subscribe to be notified of registration of available spoofed domains, for example via domain directory service 258 or domain search service 256. Registered spoofed domains database 240 may utilize data classes, which are attributes of records of spoofed domains. Examples of data classes or attributes are "GeoIP location information", "HTTP and SMTP service banners", "creation date", and "modification date". In examples, domain test manager 222 may subscribe to an RSS feed associated, for example, with domain search service 256 or domain directory service 258.

Domain test manager 222 may include similar domain collection tool 228. In some examples, similar domain collection tool 228 accesses organization domains from organization domains storage 224. In embodiments, similar domain collection tool 228 accesses available spoofed domains from available spoofed domains storage 240, which may have been populated using one or more permutation tools. In examples, similar domain collection tool may move a domain record from available spoofed domains 240 to registered spoofed domains 242 responsive to information from one or more of domain search service 256, domain directory service 258, or private domain detection service 244. In examples, spoofed domain manager 226 may include private domain detection service 244, which is configured to determine domains that are registered with private domain registration, such that personal information about the domain owner is masked. In embodiments, private domain detection service 256 may communicate with risk score manager 230 to provide information that may be used in calculating domain risk scores, entity risk scores and/or user risk scores.

In embodiments, spoofed domain manager 226 may include web server detection service 246. In examples, web server detection service 246 may comprise or utilize one or more website hosting search tools (for examples, www.hostingchecker.com, Hosting Checker, Varna, Bulgaria) and/or web hosting IP address lookup tools. In embodiments, web server detection service 246 may determine host information, offline/online status, Alexa rank, Google page rank, average load time of site, and may check domain IP blacklist, domain age with WHOIS info, social stats and SEO reports for the web server. In examples, web server detection service 246 may store fields and attributes for the domain in registered spoofed domains storage 242. In embodiments, web service detection service 256 may communicate with risk score manager 230 to provide information that may be used in calculating domain risk scores, entity risk scores and/or user risk scores.

In some examples, domain test manager 222 may include mail server detection service 246. In embodiments, mail server detection service 246 may check mail exchange records for registered spoofed domains in registered spoofed domains storage 242. In some examples, mail server detection service 246 may use on or more tools to check records, for example Nslookup (Microsoft, Redmond, Washington) or DNS queries (www.dnsqueries.com). Mail server detection service 246 can determine if a mail server is active for a given domain. In embodiments, mail server detection service 256 may communicate with risk score manager 230 to provide information that may be used in calculating domain risk scores, entity risk scores and/or user risk scores.

In some examples, domain test manager 222 may include domain content assessment service 250. In embodiments, domain content assessment service 250 may include a protected sandbox environment in which to view information hosted on one or more spoofed domains. In embodiments, domain content detection service 256 may communicate with risk score manager 230 to provide information that may be used in calculating domain risk scores, entity risk scores and/or user risk scores.

In some examples, domain test manager 222 may include punycode/IDN detection service 252. In embodiments, punycode/IDN detection service 252 may create punycodes, which use ASCII characters to represent Unicode as per RFC 3492, and compare these punycodes against domain names. In some embodiments, punycode/IDN detection service 252 may for example include international domain names (IDN), translate these into ASCIII in a standard browser and compare them against organization domains 224. In embodiments, punycode/IDN detection service 252 may utilize tools such as "xn-twist" located at www.github.com (GitHub, San Francisco, CA) to find typo squatters that are utilizing punycodes to spoof domains. In embodiments, punycode/IDN detection service 252 may communicate with risk score manager 230 to provide information that may be used in calculating domain risk scores, entity risk scores and/or user risk scores.

In some examples domain test manager 222 may include results engine 254. Results engine 254 may collect results from domain test manager 222 that may be shared with spoofed domain electronic training campaign manager 210, risk score manager 230, and user interface manager 212 such that results may be shared with a user or administrator of security awareness system.

In some embodiments, spoofed domain electronic training campaign manager 210 may send the user a link through a message directing the user to remedial training. In some examples, the user may be prevented from accessing some functions on a user device unless or until the user completes one or more remedial training modules. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 220 may track all the remedial training that is completed by the user, started and not completed by the user, and not started by the user.

Each of server 106, spoofed domain electronic training campaign manager 210, user interface manager 212, customized training generator 214, training completion monitor 220, domain test manager 222, spoofed domain manager 226, similar domain collection tool 228, private domain detection service 244, web server detection service 246, mail server detection service 248, domain content assessment service 250, punycode/IDN detection service 252, results engine 254, risk score manager 230, entity domain exploit calculator 232, and entity domain risk calculator 234 may comprise a program, service, task, script, library, application or any type and form of executable instructions or code executable on one or more processors.

Any of server 106, spoofed domain electronic training campaign manager 210, user interface manager 212, customized training generator 214, training completion monitor 220, domain test manager 222, spoofed domain manager 226, similar domain collection tool 228, private domain detection service 244, web server detection service 246, mail server detection service 248, domain content assessment service 250, punycode/IDN detection service 252, results engine 254, risk score manager 230, entity domain exploit calculator 232, and entity domain risk calculator 234 may be combined into one or more modules, applications, programs, services, tasks, scripts, libraries, applications, or executable code.

Server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Figure 2B:
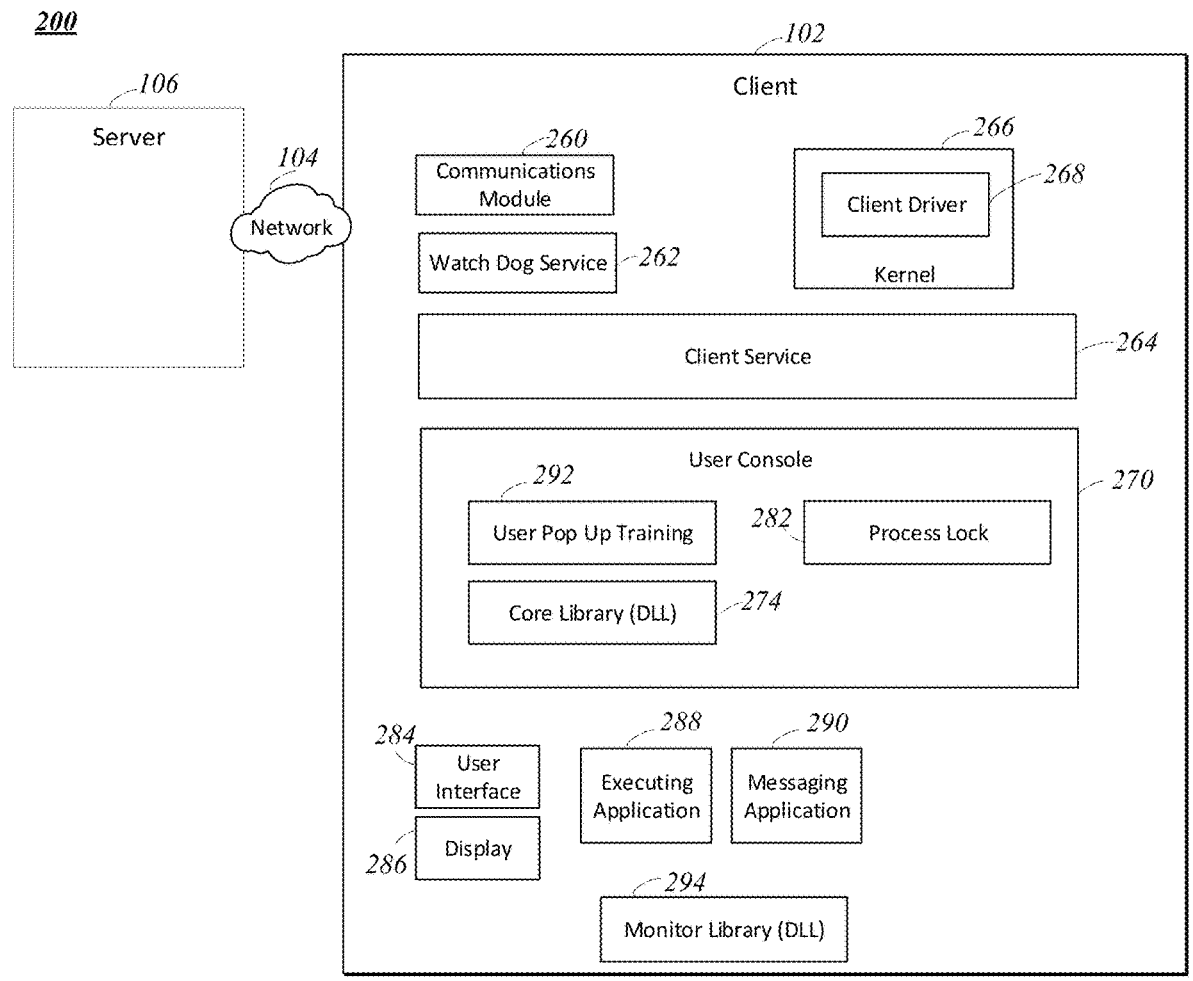
FIG. 2B depicts an implementation of some of the client architecture of an implementation of a system capable of identifying spoofed domains and training users, according to some embodiments.

Referring to FIG. 2B, in a general overview, FIG. 2B depicts some of the client architecture of an implementation of a system 200 capable of creating, controlling and executing electronic campaigns, searching and testing domains, and creating, controlling and utilizing risk scores with based on domain spoof risk and user behavior. The system 200 also includes client 102. Client 102 may include communications module 260, watch dog service 262, and a client service 264. The client 102 may include a kernel 266 which may include a client driver 268. The client may include user console 270, which may include a core library (DLL) 274, a process lock 282, and user pop up training 292. The client may include one or more executing applications 288 and one or more messaging applications 290 and may include a monitor library (DLL) 294.

Referring to FIG. 2B, in more detail, a client may fall victim to a spoofed domain. For example, the client may be an employee, member, or independent contractor for an organization where the organization has one or more domains associated with it. Client 102 may be any device used by the client. The client does not need to own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some implementations, client 102 may include communications module 260. This may be a library, application programming interface (API), a set of scripts, or any other code that may facilitate communications between client 102 and any of server 106, a third-party server, or any other server. In some embodiments, communications module 260 determines when to transmit information from client 102 to external servers via network 104. In some embodiments, communications module 260 receives information from server 106 via network 104. In some embodiments, the information transmitted or received by communications module 260 may correspond to a message, such as an email, generated or received by messaging application 290.

Client 102 may include client service 264. Client service 264 may register client driver 268 into the operating system's kernel 266. Client driver 268 may be designed to monitor certain processes within the operating system. Client service 264 may ensure that client driver 268 is installed properly into the operating system. Once client driver 268 is registered, client service 264 may wait for other critical startup programs to start (like winlogon.exe or explorer.exe in Windows), and then it may start user console 270. In some examples, client service 264 also restarts user console 270 should it crash or be terminated forcefully. Client service 264 may not be associated with the user but may be running in the background on the client all the time when started by watch dog service 262. In some embodiments, client service 264 interacts with user console 270 which runs in the user space allowing the system to pop up messages that target the user with dialogs. In some examples, if the user attempts to access a registered spoofed domain that is known to server 106, client service 264 may interact with the user console 270 to create a pop up for the user and to activate process lock 282 such that the user cannot use any of the processes running on the client device. Client 102 may include user pop up training 292 which is provided via the user pop up created by user console 270. Client service 264 may also start user console 270 for every user that logs into a user profile. There may be several instances of user console 270 for every logged in user. Client service 264 may be a separate component that monitors and may in some instances be able to control user console 270 when initiated (e.g., initiate user pop up training 292, or temporarily pause execution of an application using process lock 282, such as pausing execution of a web browser).

User console 270 may run in the user space of the operating system. User console 270 may raise prompts, get replies, and take care of everything that needs to be done interactively with the user. User console 270 may be equipped with an internal library, core library 274, which allows it to detect processes being created or terminated by the operating system. Whenever the OS creates a process, user console 270 may detect it and may block the execution of the process using process lock 282. User console 270 may connect with client service 254 for its settings.

In some examples, client 102 may include watch dog service 262. Watch dog service 262 may start and monitor client service 264. Watch dog service 262 may be launched as a delayed service (several minutes after all the services start, the delayed services start running). When watch dog service 262 starts up, it may check to see if client service 264 is running, and if not, then watch dog service 262 may start this service. In another aspect, if a user has advanced privileges and tries to kill client services 262, watch dog service 264 will see that the service is not running, and it may start it up again. In this way, watch dog service 264 may act as a failsafe to ensure that client service 264 is always running. Watch dog service 262 can also stop and/or restart client service 264.

In some embodiments, client 102 may include user interface 284 such as a keyboard, a mouse, a touch screen, or other appropriate user interface. This may be a user interface that is e.g. connected directly to client 102, such as, for example, a keyboard connected to a mobile device, or may be connected indirectly to client 102, such as, for example, a user interface of a client device used to access a server client 102. The client may include display 286, such as a screen, a monitor connected to the device in any manner, or any other appropriate display.

In an implementation, client 102 may include messaging application 290. Messaging application 290 may be any application capable of viewing, editing, and/or sending messages. For example, messaging application 290 may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application 290 can be configured to display spoofed domain electronic training.

In some examples, client 102 receives spoofed domain electronic training sent by server 106 based upon a spoofed domain electronic training campaign created by customized training generator 214 and executed by spoofed domain electronic training campaign manager 210. Client 102 may receive simulated phishing messages via messaging application 290, display received messages for the user using display 286, and accept user interaction via user interface 284 responsive to displayed messages. In some embodiments, if the user interacts with a spoofed domain, or fails to recognized a spoofed domain, client 102 traverses on the client device to a landing page selected for the spoofed domain electronic training campaign. Client 102 may lock processes on the client device until the user completes the electronic training campaign.

Each of client 102, user interface 284, communications module 260, messaging application 290, executing application 288, client service 264, user console 270, watch dog service 262 may comprise a program, service, task, script, library, application or any type and form of executable instructions or code executable on one or more processors. Any of client 102, user interface 284, communications module 260, messaging application 290, executing application 288, client service 264, user console 270, watch dog service 262 may be combined into one or more modules, applications, programs, services, tasks, scripts, libraries, applications, or executable code.

Figure 3:
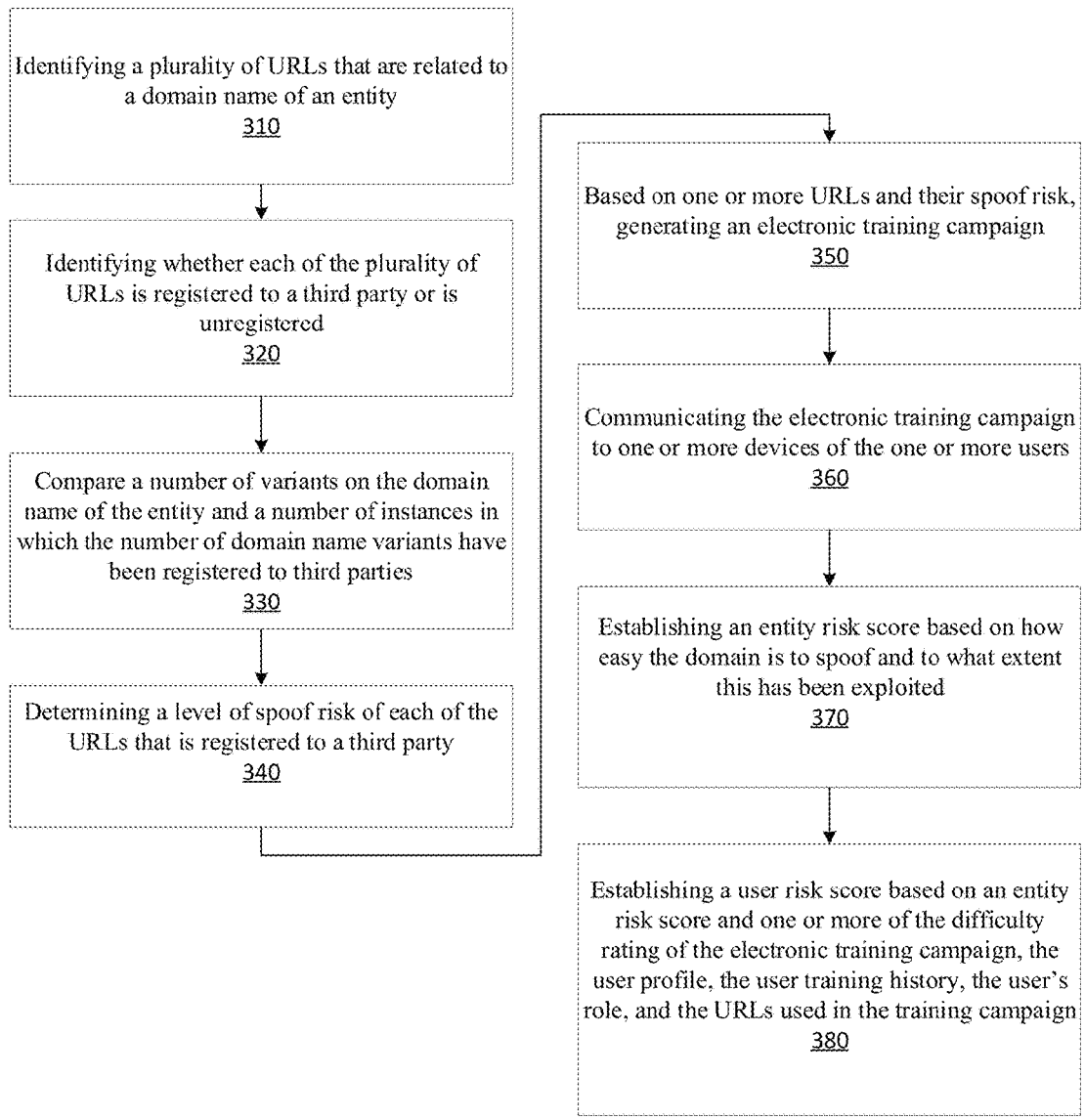
FIG. 3 depicts an implementation of a method for identifying spoofed domains and providing electronic training to users, according to some embodiments.

Referring to FIG. 3 in a general overview, FIG. 3 depicts an implementation of a method 300 for identifying providing spoofed domain electronic training to one or more users. In step 310, method 300 may include identifying a plurality of URLs that are related to a domain name of an entity. In some examples, the method 300 may include identifying whether each of the plurality of URLs is registered to a third party or is unregistered (step 320). Method 300 may include comparing a number of variants on the domain name of the entity and a number of instances in which the number of domain name variants have been registered to third parties (step 330). In some embodiments, method 300 may include determining a level of spoof risk of each of the URLs that is registered to a third party (step 340). Based on one or more URLs and their spoof risk, method 300 may include generating an electronic training campaign (step 350). In step 360, method 300 may include communicating the electronic training campaign to one or more devices of the one or more users. Method 300 may include establishing an entity risk score based on how easy the domain is to spoof and to what extent this has been exploited (step 370). Method 300 may also include establishing a user risk scored based on an entity risk score and one or more of the difficult rating of the electronic training campaign, the user profile, the user training history, the user's role, and the URLs used in the training campaign (step 380).

Referring to FIG. 3 in more detail, method 300 may include identifying a plurality of URLs that are related to a domain name of an entity (step 310). A domain name that is related to or "associated" with a domain name of an entity is a domain name that is either identical and equivalent to the domain name of the entity or is a domain name that is very similar in structure and appearance to a domain name of an entity, such that a user may overlook the differences between the actual domain name and the "associated" domain name. An associated domain name may also be called a spoofed domain name, a look-alike domain name, a similar domain name, and/or an imposter domain name. In examples, domain test manager 222 may use one or more tools to create permutations of one or more organization domains to create a list of imposter domains. For example, domain test manager 222 may use the tool "dns-twist" located at www.github.com (GitHub, San Francisco, CA) which takes one or more organization domain names as a seed and generates a list of potential spoofed domains. In some examples, a plurality of URLs associated with a domain name of an entity that are not registered by the entity are stored in available spoofed domains storage 240. In some examples, similar domain collection tool 244 and punycode/IDN detection service 252 may find potential spoofed domains based upon punycode (including internationalized) domain squats. A punycode uses ASCII characters to represent Unicode. Punycodes, when translated to ASCII, can resemble or even duplicate legitimate URLs.

In some examples, method 300 may include identifying whether each of the plurality of URLs is registered to the entity or to a third party (step 320). In some examples, an administrator of the entity removes domains owned by the entity from registered spoofed domains storage 242 and available spoofed domains storage 240. In some examples, an administrator of the entity moves domains owned by the entity from registered spoof domains storage 242 and available spoofed domains storage 240 to organization domains storage 224. In some embodiments, an administrator of the entity populates organization domains storage 224 with domains that are registered to the organization. In some examples, domain test manager 222 may compare the list of spoofed domain names with domains that are stored in organization domains storage 224 and remove domains that belong to the entity from available spoofed domains 240 and/or registered spoofed domains storage. In some examples, domain test manager 222 may communicate with domain directory service 258 to determine if a URL is registered to a third party. For example, domain test manager 222 may look up a domain at ICANN WHOIS (www.icann.org) utilizing a query with the domain name in question or using an API with multiple domain names in the API call. In some embodiments, a query made to domain directory service 258 from domain test manager 222 may return information such as the registrar of the domain, the status of the domain, and the date the domain was created or updated and the date the domain expires. In some examples, information about the domain may be returned in a raw WHOIS record, for example:

Domain Name: GOOGLE.COM
    Registry Domain ID: 2138514_DOMAIN_COM-VRSN
    Registrar WHOIS Server: whois.markmonitor.com
    Registrar URL: http://www.markmonitor.com
    Updated Date: 2018 Feb. 21T18:36:40Z
    Creation Date: 1997 Sep. 15T04:00:00Z
    Registry Expiry Date: 2020 Sep. 14T04:00:00Z
    Registrar: MarkMonitor Inc.
    Registrar IANA ID: 292
    Registrar Abuse Contact Email: abusecomplaints@markmonitor.com
    Registrar Abuse Contact Phone: +1.2083895740
    Domain Status: clientDeleteProhibited https://icann.org/epp#clientDeleteProhibited
    Domain Status: clientTransferProhibited https://icann.org/epp#clientTransferProhibited
    Domain Status: clientUpdateProhibited https://icann.org/epp#clientUpdateProhibited
    Domain Status: serverDeleteProhibited https://icann.org/epp#serverDeleteProhibited
    Domain Status: serverTransferProhibited https://icann.org/epp#serverTransferProhibited
    Domain Status: serverUpdateProhibited https://icann.org/epp#serverUpdateProhibited
    Name Server: NS1.GOOGLE.COM
    Name Server: NS2.GOOGLE.COM
    Name Server: NS3.GOOGLE.COM
    Name Server: NS4.GOOGLE.COM
    DNSSEC: unsigned
    URL of the ICANN Whois Inaccuracy Complaint Form: https://www.icann.org/wicf/>>>Last update of whois database: 2018-09-25T17:04:36Z<<<

In some examples, domain test manager may move spoofed domains from available spoofed domains storage 240 to registered spoof domains storage 242 upon determining through a query or API call that the domain is registered.

Figure 4:
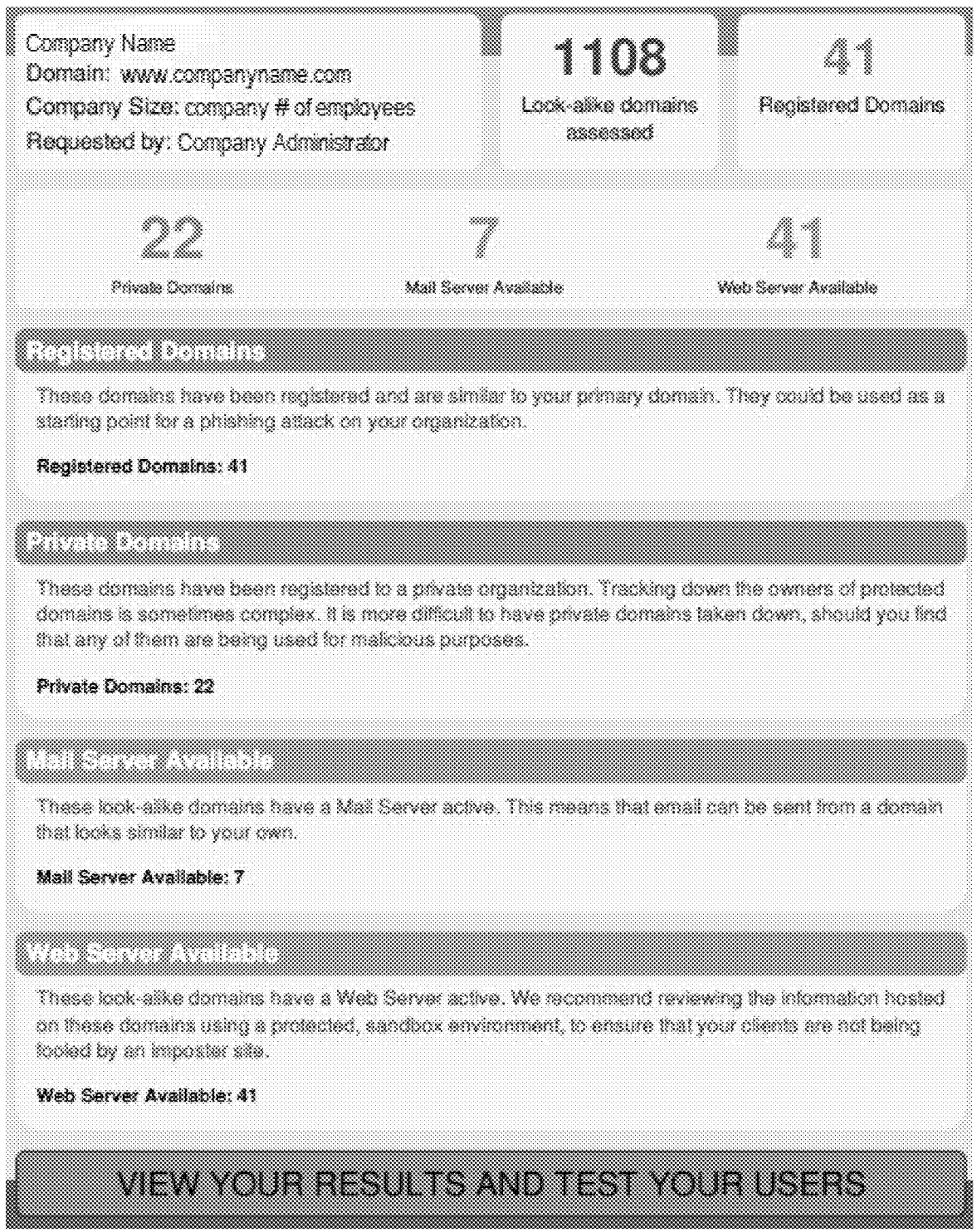
FIG. 4 depicts an illustration of an example of a results report from a domain test manager, according to some embodiments.

Method 300 may include comparing a number of variants on the domain name of the entity and a number of instances in which the number of domain name variants have been registered to third parties (step 330). In some examples, the domain test manager 222 may calculate a percentage of spoofed domains that have been registered to third parties to total spoofed domains. In some examples, user interface manager 212 may display a report which comprises the total number of spoofed or "look-alike" domains that have been assessed and the total number of registered look alike domains (for example, as shown in FIG. 4).

In some embodiments, method 300 may include determining a level of spoof risk of each of the URLs that is registered to a third party or is privately registered (step 340). A domain that is registered to a third party may be privately registered, i.e., privately registered spoofed domains are a subset of third party spoofed domains. In some embodiments, a level of spoof risk for a URL that is a spoof of one or more entity domains is higher when the associated URL has a website that is made to look similar to, or exactly like the, actual website on the entity's domain. In some examples, a level of spoof risk for a spoofed domain may be higher if a greater number of users fail to recognize the spoofed domain as different from the entity's actual URL or domain. In some embodiments, a level of spoof risk is determined for an entity domain. In examples, a level of spoof risk may be determined for one or more spoofed domains to an entity domain. In embodiments, a level of spoof risk for an entity domain is formed by aggregating one or more levels of spoof risk for spoofed domains to the entity domain. In some embodiments, a level of spoof risk for an entity domain is higher when there are a greater number of spoofed domains. In some examples, a level of spoof risk for an entity domain is higher when there are a greater number of available spoofed domains, whether or not they are registered spoofed domains. A level of spoof risk for an entity domain may be lower if a greater number of users at the entity have been trained about typo squatting and domain spoofing. A level of spoof risk for an entity domain may be lower if a greater number of users at the entity have passed security awareness tests on recognizing domains that are spoofs of their entity domain (i.e., look-alike domains). In some embodiments, a level of spoof risk for an entity domain may be higher if a greater number of spoofed domains have an active mail server. In examples, a level of spoof risk for an entity domain may be higher if a greater number of spoofed domains have an active web server. In examples, a level of spoof risk for an entity domain may be higher if a greater number of IDN or punycode spoofed domains of the entity domain have been detected. A level of spoof risk for an entity domain may be higher if a greater number of spoofed domains are privately registered. In examples, a metric can be developed that will compare the number of potential spoofs or twists on a domain name provided by specific tools such "xn-twist" and "dns-twist", located at www.github.com (GitHub, San Francisco, CA), with the number of instances where those spoof domains are found to have been registered to a third party or to be privately registered. A domain that is registered to a third party may be privately registered, i.e., privately registered spoofed domains are a subset of third party spoofed domains. This will indicate (1) how "easy" the entity domain is to spoof and (2) to what extent this spoof risk has already been exploited. In some examples, available spoofed domains found by domain test manager 222 may be registered by the entity in order to prevent them from being registered by typo squatters.

Based on one or more URLs and their spoof risk, method 300 may include generating an electronic training campaign (step 350). Spoofed domain electronic training campaign manager 210 and/or customized training generator 214 may generate one or more training campaigns to educate users about the risks associated with spoofed domains. In some embodiments, domain test manager 222 may execute a test on one or more entity domains to determine several results, for example the number of spoofed domains that have been found and/or assessed, the number of registered spoofed domains, the number of private domains, the number of domains with a mail server available, and/or the number of domains with a web server available. The results of the test may be used to test users' knowledge of spoofed domains using a security awareness test by system 200. In examples, domain spoof training may be prioritized if the entity domain has been found to be highly vulnerable to spoofing (e.g., because of a high number of available spoofed domains) and/or if the domain is highly spoofed (e.g., because of a high number of registered spoofed domains). In some embodiments, actual spoofed domains that have been found may be used in the training to render it more realistic and accurate.

In some embodiments, spoofed domain electronic training campaign manager 210 may generate a quiz for a user which shows a number of domains comprising genuine domains and spoofed domains and which asks the user to identify which domains are real and which domains are spoofed. Users may be scored on the quiz. The content of the quiz may be tailored to a specific organization or entity, group of users and/or user. In some examples, the quiz may be given a difficulty rating based on the similarity of the discovered spoofed URLs to the real URLs that have been found by domain test manager 222 and used by spoofed domain electronic training campaign manager 210 in generating electronic training.

In step 360, method 300 may include communicating the electronic training campaign to one or more devices of the one or more users. Spoofed domain electronic training can be delivered to the user by sending the user a new message with a link that takes them to remedial training materials. The client service 264 may create a pop up on a user device using user console 270. In some examples user console 270 generates the pop up immediately after the user has accessed a known spoofed domain, such as a spoofed domain in available spoofed domains storage 240 or registered spoofed domains storage 242. In some examples, user console 270 generates a pop up when the user next tries to access their device. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 220 may track all the remedial training that is completed by the user, started and not completed by the user, and not started by the user.

Client 102 may include user pop up training 292 which is provided via the user pop up created by user console 270. Client service 264 may also start user console 270 for every user that logs into a user profile. There may be several instances of user console 270 for every logged in user. Client service 264 monitors and can in some instances control user console 270 when initiated (e.g., initiate user pop up training 292, or temporarily pause execution of an application using process lock 282, such as pausing execution of a web browser).

Training generated by customized training generator 214 may be of any appropriate format. For example, training may be provided in the form of email messages, text or SMS messages, messages used by particular messaging applications such as, e.g. WhatsApp™ (Facebook, Menlo Park, California), or any other type of message. Training may be provided as videos, documents, interactive games, interactive chats, or other content types to be used in a particular training campaign selected by e.g. server 106 using spoofed domain electronic training campaign manager 210. Messages and/or content may be generated in any appropriate manner, e.g. by running an instance of an application that generates the desired message type, such as running e.g. a Gmail™ application (Google, Mountain View, California), Microsoft Outlook™ (Microsoft, Redmond, Washington), a text messaging application, or any other appropriate application. The messages may be generated by running a messaging application on e.g. virtual machine 216 or may simply be run on an operating system of server 106 or may be run in any other appropriate environment. The messages may be generated to be formatted consistent with specific messaging platforms, for example Outlook 365 (Microsoft, Redmond, Washington), Outlook Web Access (OWA) (Microsoft, Redmond, Washington), Webmail, iOS (Apple, Cupertino, California), Gmail client (Google, Mountain View, California), and so on. In some embodiments, the customized training generator 214 can be configured to generate messages having the ability to traverse users who interact with the messages to a specific landing page to provide further training.

In some embodiments, customized training generator 214 can be configured to generate a simulated phishing email which tests a user's response to one or more spoofed domains. The email can appear to be delivered from a trusted email address which is actually an email address associated with a spoofed domain, such as the email address of an executive of the company at which the targeted user is employed. In addition, the email can have a "Subject:" field that is intended to cause the user to take an action, such as clicking on a link or accessing the spoofed domain. In some embodiments, customized training generator 214 can generate one or more simulated phishing emails which are stored in the domain spoofing training modules storage 218. In some embodiments, customized training generator 214 can generate multiple instances of the email which may be delivered to multiple users, such as a subset of all of the employees of the company. In some embodiments, customized training generator 214 can generate multiple instances of the email which may be delivered to a user group. For example, server 106 can select any number of employees who should be targeted by a spoofed domain training test, can create a user group and store this user group in memory 122. Customized training generator 214 can retrieve this information from memory 122 and can generate a set of emails similar to the email, each addressed to a respective target identified in the information stored in the memory 122. That is, customized training generator 214 can generate the emails such that the "From:" and "Subject:" fields of each email are identical, while the "To:" field is adjusted according to the desired targets.

A user may be selected for spoofed domain training based on a time-based determination. For example, the user may be selected because of an amount of time that has passed since they last had spoofed domain training, or for example the amount of time since the user had last attempted to access a spoofed domain. A user or a group of users may be selected based on a risk profile for the user or group of users. For example, the user may be selected because users that share similar characteristics to the user have been historically more prone to access spoofed domains. Artificial intelligence and/or machine learning may be used to create spoofed domain content that is targeted towards a user or group of users, for example by customized training generator 214. In some embodiments, spoofed domain electronic training campaign manager 210 may use, for example, knowledge of the user's situation or location, the type of user passwords that the user has historically used, the user breach history, the user's compliance to user IT policies and/or entity IT policies to select a predetermined template or set of templates that may be used, or may be modified to be used, for the spoofed domain electronic training campaign.

In some embodiments, the actual domain chosen for training may be a domain belonging to the organization the employee works for or any related domains for that entity or the domain could be chosen from domains that are regularly used in the course of that company's or individual employees' work. In some embodiments, domain test manager 222 may test commonly used domains instead of organization domains, for the purpose of this type of training. In this way the training can be further targeted to provide highly relevant examples to individual users. In some embodiments, a similar approach may be used for other organizational specific items such as trademarks, trade dress, and/or news stories about the company.

Method 300 may include establishing an entity risk score based on how easy the domain is to spoof and to what extent this has been exploited (step 370). Method 300 may also include establishing a user risk scored based on an entity risk score and one or more of the difficult rating of the electronic training campaign, the user profile, the user training history, the user's role, and the URLs used in the training campaign (step 380). In some examples, user, group or entity risk scores may be adjusted in accordance with metrics developed based on the number of available spoofed domains and/or the number of registered spoofed domains and/or the nature of the content on registered spoofed domains that have web servers. Responsive to the outcome of spoofed domain electronic training, the system can take a range of actions, for example initiating further training, modifying user, group, or entity risk scores, and giving HR warnings. In some embodiments, the degree, severity, frequency or intensity of the outcomes may be moderated based on the difficulty rating given to the training. For example, some consideration as to the similarity of the spoofed domains to the genuine entity domains could introduce some tiering into the training.

Method 300 may also include changing one or more user properties responsive to the user's risk score or an entity risk score. Risk score manager 230 may monitor and control inputs and various other system aspects which would lead to the adjustment of user or entity risk scores, for example in response to updated information domain test manager 222, or inputs from similar domain collection tool 228, private domain detection service 244, web server detection service 246, mail server detection service 248, domain content assessment serviced 250, punycode/IDN detection service 252, and/or training completion monitor 220. Risk score manager 230 may update user risk scores in user risk scores storage 238, and/or entity risk scores in entity risk scores storage 236, in response to completion of one or more domain spoofing training modules and/or training campaigns and may process requests for access to risk scores and/or may perform other tasks related to the management of risk scores for users and/or entities.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed:
1. A method comprising:
identifying, by one or more processors, via mail exchange records of each of a plurality of uniform resource locators (URLs) of a plurality of spoofed domains of a domain name of an entity, a first one or more spoofed domains of the plurality of spoofed domains of the entity are registered to one or more parties other than the entity and a second one or more spoofed domains of the plurality of spoofed domains of the entity are unregistered;

determining, by the one or more processors, a level of spoof risk for the domain name of the entity based at least on a number of the first one or more spoofed domains that are registered to one or more parties other than the entity in comparison to a number of the plurality of spoofed domains, wherein the level of spoof risk for the domain name is higher when the number of the first one or more spoofed domains of the plurality of spoofed domains of the entity is greater than the number of the second one or more spoofed domains of the plurality of spoofed domains of the entity;

identifying, by the one or more processors based at least on the level of spoof risk, the second one or more spoofed domains of the plurality of spoofed domains of the entity that are unregistered; and generating a notification that the second one or more spoofed domains are available to be registered to the entity.

2. The method of claim 1, further comprising identifying, by a domain test manager, the second one or more spoofed domains of the plurality of spoofed domains as available to be registered by the entity.

3. The method of claim 1, further comprising determining, by the one or more processors, the level of spoof risk for the domain name of the entity based on aggregating one or more levels of spoof risk of the plurality of spoofed domains.

4. The method of claim 1, further comprising determining, by the one or more processors, the level of spoof risk for the domain name of the entity based on a number of users of the entity that have been trained about typo squatting or domain spoofing.

5. The method of claim 1, further comprising determining, by the one or more processors, the level of spoof risk for the domain name of the entity based on a number of users of the entity that have been passed security awareness tests on recognizing domains that are spoofs of the entity domain.

6. The method of claim 1, further comprising determining, by the one or more processors, the level of spoof risk for the domain name of the entity based on a number of the spoofed domains that have an active web server.

7. The method of claim 1, wherein one or more of the plurality of spoofed domains comprises punycodes or permutations of a uniform resource locator (URL) of the domain of the entity.

8. The method of claim 1, further comprising communicating, by the one or more processors, to one or more devices of one or more users an electronic training configured to train the one or more users to identify between the domain of the entity and one or more of the plurality of spoofed domains.

9. A system comprising:
one or more processors, coupled to memory, and configured to:
identify, via mail exchange records of each of a plurality of uniform resource locators (URLs) of a plurality of spoofed domains of a domain name of an entity, a first one or more spoofed domains of the plurality of spoofed domains of the entity are registered to one or more parties other than the entity and a second one or more spoofed domains of the plurality of spoofed domains of the entity are unregistered;

determine a level of spoof risk for the domain name of the entity based at least on a number of the first one or more spoofed domains that are registered to one or more parties other than the entity in comparison to a number of the plurality of spoofed domains, wherein the level of spoof risk for the domain name is higher when the number of the first one or more spoofed domains of the plurality of spoofed domains of the entity is greater than the number of the second one or more spoofed domains of the plurality of spoofed domains of the entity;

identify, based at least on the level of spoof risk, the second one or more spoofed domains of the plurality of spoofed domains of the entity that are unregistered; and generate a notification that the second one or more spoofed domains are available to be registered to the entity.

10. The system of claim 9, wherein a domain test manager is configured to identify the second one or more spoofed domains of the plurality of spoofed domains as available to be registered by the entity.

11. The system of claim 9, wherein the one or more processors are further configured to determine the level of spoof risk for the domain name of the entity based on aggregating one or more levels of spoof risk of the plurality of spoofed domains.

12. The system of claim 9, wherein the one or more processors are further configured to determine the level of spoof risk for the domain name of the entity based on a number of users of the entity that have been trained about typo squatting or domain spoofing.

13. The system of claim 9, wherein the one or more processors are further configured to determine the level of spoof risk for the domain name of the entity based on a number of users of the entity that have been passed security awareness tests on recognizing domains that are spoofs of the entity domain.

14. The system of claim 9, wherein the one or more processors are further configured to determine the level of spoof risk for the domain name of the entity based on a number of the spoofed domains that have an active web server.

15. The system of claim 9, wherein one or more of the plurality of spoofed domains comprises punycodes or permutations of a uniform resource locator (URL) of the domain of the entity.

16. The system of claim 9, wherein the one or more processors are further configured to communicate to one or more devices of one or more users an electronic training configured to train the one or more users to identify between the domain of the entity and one or more of the plurality of spoofed domains.

* * * * *